Aug. 24, 1943. T. ULRICH 2,327,585
BOLT SPACER OR REINFORCING MEMBER
Filed Aug. 4, 1939
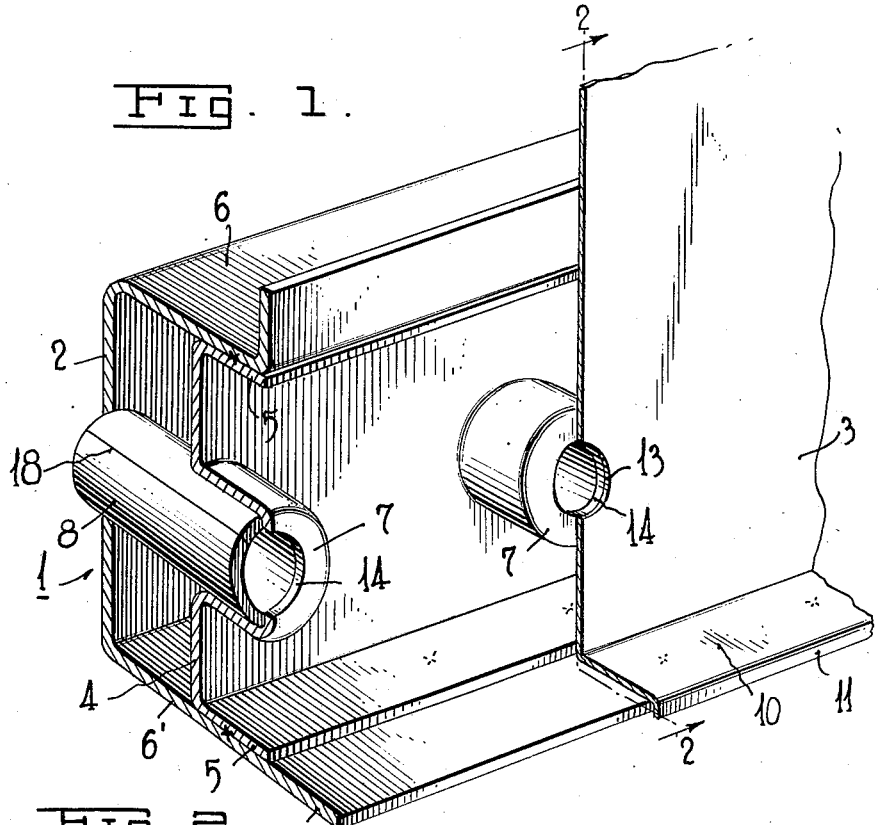
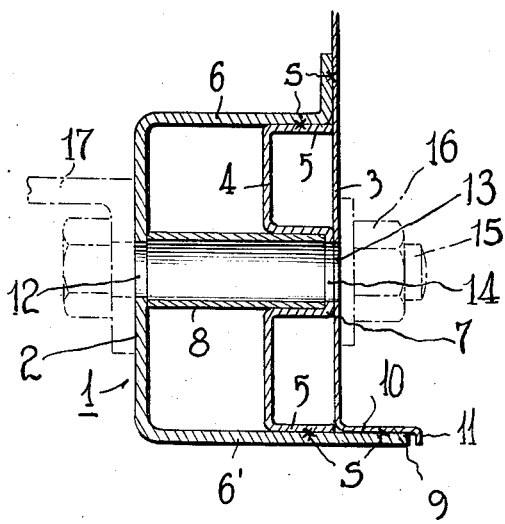
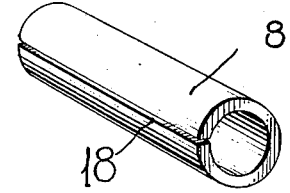
Inventor
Theodore Ulrich
By John P. Tarbox
Attorney Patented Aug. 24, 1943

2,327,585

UNITED STATES PATENT OFFICE 2,327,585

BOLT SPACER OR REINFORCING MEMBER

Theodore Ulrich, Detroit, Mich., assignor to Edward G. Budd Manufacturing Company, Philadelphia, Pa., a corporation of Pennsylvania Application August 4, 1939, Serial No. 288,273

7 Claims. (Cl. 189—34)

The present invention pertains to means for installing bolt spacers and to reinforcing members in a channel or box section structural member.

This invention will be readily understood from the following description in which suitable reference is made to the appended drawing.

In the drawing:

Fig. 1 is a perspective view partly broken away;

Fig. 2 is a cross-section taken on the line 2—2 of Fig. 1 in the direction of the arrows as shown; and Fig. 3 is a perspective view of one of the elements of the improved construction.

In the drawing reference numeral 1 designates a channel member made of metal and forming one panel 2, to which is to be attached a second panel member 3. Furthermore a third element 4 with flanges 5 thereon forming a snug fit with sides 6, 6' of channel 1 is provided.

At points at which reinforcement is desired, sockets 7 are formed in the side of element 4, preferably by di-pressing. Reinforcing elements 8 shown as open seam tubular spacers of a length equal to the depth of channel 1 are fitted into sockets 7. The elements 4 and 8 are then fitted into the channel 1 as shown, the bottom of sockets 7 being substantially flush with the open end of the channel. Panel 3 is then placed upon the open end of channel 1, and the parts suitably secured together as by spot-welding at the points designated by S in Fig. 2. One side 6' of channel 1 may have an extension thereon as at 9. In this event panel 3 may have a flange 10 correspondingly formed thereon for covering extension 9. Turned-over portion 11 may also be provided on flange 10 for covering the end of extension 9.

Reinforcing elements 8 may also form bolt spacers as illustrated in the drawing. In this case channel 1, panel 3 and sockets 7 will have holes 12, 13 and 14 respectively formed therein, these holes being aligned with each other and with the bores of reinforcing elements 8. As indicated by dotted lines, the bolt 15 may extend through spacer 8 and may serve together with its nut 16 for connecting a bracket 17, for instance a motor supporting bracket, to the structure formed by the members 1, 3 and 4.

As illustrated the reinforcing elements 8 are formed with an open seam 18 (see Fig. 3). This open seam allows for compression of the tube forming the element when the latter is inserted within socket 7, thus assuring a tight fit without expensive precision labor.

While only two spacers have been included in the illustration of the invention, it will be apparent that an assembly of this nature may contain any number of spacers of any desired size or grouping. Also, as indicated above, the shape of element 4 as well as the shape and flanges of panel 3 may vary considerably within the spirit of the present invention in order to accommodate the shape and purpose of the part they are designed to reinforce.

The box-like construction described above will be seen to possess great strength and rigidity, the element 4, with its sockets 7 tightly enclosing the open seam tubular member 8, greatly enhancing the structural resistance of this type of spacer. Moreover, since the sockets 7 provide a definite stop for the end of the spacer or reinforcing element 8, panel 3 forming this side of the box member may be of comparatively light gauge, as shown, without sacrifice of strength.

Embodiments of the present invention other than that illustrated herein will immediately suggest themselves to one skilled in the art.

The invention is especially designated for chassis or bodies having box sectional sills as shown for instance in my copending application Serial No. 299,595, for Vehicle body, filed October 16, 1939. Spacers or reinforcements in accordance with the invention may be arranged in a vehicle structure wherever it seems to be advantageous; said members may especially be used for the attachment of the motor, the springs for the road wheels, etc.

I claim:

1. A structural unit comprising an open-sided member, reinforcing means for said member including a channel-shaped element mounted in the open side of said member, the open side of said element coinciding with that of said member, a socket formed in said element, said socket opening away from the open side of said member, a second element secured in said socket and extending to and engaging said member, and a closure secured to said member across the open end thereof and in engagement with said channel-shaped element to form with said member a closed box-like construction.

2. A structural unit comprising an open-sided member, reinforcing means for said member including a channel-shaped element mounted in the open side of said member, the open side of said element coinciding with that of said member, a socket formed in said element, said socket opening away from the open side of said member, an open seam tubular spacer of resilient material and of such size and shape as to be compressible into said socket for tight engagement therewith, said spacer extending to and engaging said member, and a closure secured to said member across the open end thereof and in engagement with said channel-shaped element to form with said member a closed box-like construction.

3. A structural unit comprising an open-sided member, reinforcing means for said member including a channel-shaped element mounted in the open side of said member, the open side of said element coinciding with that of said member, a socket formed in said element, said socket opening away from the open side of said member, a bolt spacer secured in said socket and extending to and engaging said member, said member, said socket and bolt spacer having holes therein aligned with each other so that a bolt may be passed therethrough, and a closure secured to said member across the open end thereof and in engagement with said channel-shaped element to form with said member a closed box-like construction.

4. A structural unit comprising an open-sided member, reinforcing means for said member including a channel-shaped element mounted in the open side of said member, the open side of said element coinciding with that of said member, a socket formed in said element, said socket opening away from the open side of said member, a bolt spacer of resilient open seam tubular construction and of such size and shape as to be compressible into said socket for tight engagement therewith, said member, said socket and bolt spacer having holes therein aligned with each other so that a bolt may be passed therethrough, and a closure secured to said member across the open end thereof and in engagement with said channel-shaped element to form with said member a closed box-like construction.

5. A structural unit comprising a hollow member, reinforcing means for said member including a web mounted in the interior of said member, a socket comprising an end wall and being formed in said web, and an elongated element being secured in said socket and extending to and engaging said member.

6. A structural unit comprising an open-sided, hollow member, reinforcing means for said member including a web provided with marginal flanges mounted from the open side of said member in the interior thereof, a socket formed in said web, said socket having an end wall, the mouth of said socket facing in the direction away from the open side of said member, and an elongated element having one end secured in said socket and its other end extending toward and engaging a wall portion of said member faced by the mouth of said socket.

7. A hollow, open-sided structure, reinforcing means for said structure including an element having a web mounted in the open side of said structure, a socket formed in said web, said socket having a bottom wall or flange and opening in a direction transversely to the plane of said web, and a hollow tubular bolt spacer having its one end secured in said socket and its other end extending to and engaging one wall of said structure, said end wall of said socket and said wall of said structure having holes therein aligned with the open ends of said bolt spacer so that a bolt may be passed therethrough.

THEODORE ULRICH.